United States Patent
Son

(10) Patent No.: US 9,785,805 B2
(45) Date of Patent: Oct. 10, 2017

(54) REEL RECEIVING DEVICE BASED ON RFID

(71) Applicant: Young-Jeon Son, Gyeonggi-do (KR)

(72) Inventor: Young-Jeon Son, Gyeonggi-do (KR)

(*) Notice: Subject to any disclaimer, the term of this patent is extended or adjusted under 35 U.S.C. 154(b) by 0 days.

(21) Appl. No.: 15/031,583

(22) PCT Filed: Oct. 25, 2013

(86) PCT No.: PCT/KR2013/009604
§ 371 (c)(1),
(2) Date: Jun. 7, 2016

(87) PCT Pub. No.: WO2015/060484
PCT Pub. Date: Apr. 30, 2015

(65) Prior Publication Data
US 2016/0275318 A1  Sep. 22, 2016

(51) Int. Cl.
*G06K 7/10* (2006.01)
*A47B 55/02* (2006.01)
*A47F 10/00* (2006.01)
*G06K 19/07* (2006.01)
*H01Q 1/22* (2006.01)

(52) U.S. Cl.
CPC .......... *G06K 7/10128* (2013.01); *A47B 55/02* (2013.01); *A47F 10/00* (2013.01); *G06K 7/10356* (2013.01); *G06K 19/0723* (2013.01); *A47F 2010/005* (2013.01); *H01Q 1/2216* (2013.01)

(58) Field of Classification Search
CPC .................. G06K 7/10316–7/10356
See application file for complete search history.

(56) References Cited

U.S. PATENT DOCUMENTS

| | | | | |
|---|---|---|---|---|
| 6,116,436 A | * | 9/2000 | Ferrucci | A47B 55/02 108/181 |
| 7,436,303 B2 | * | 10/2008 | Tourrilhes | G06Q 10/06 235/385 |
| 8,406,915 B2 | * | 3/2013 | Hong | A47B 53/02 211/1.57 |
| 2007/0159333 A1 | * | 7/2007 | Deguchi | H01Q 7/06 340/572.7 |

(Continued)

FOREIGN PATENT DOCUMENTS

| | | | |
|---|---|---|---|
| JP | 1996-012027 | | 1/1996 |
| JP | 2008037561 A | * | 2/2008 |

(Continued)

*Primary Examiner* — Christle I Marshall
(74) *Attorney, Agent, or Firm* — Womble Carlyle Sandridge & Rice LLP

(57) ABSTRACT

A reel receiving device based on RFID is disclosed. A reel receiving device according to one embodiment of the present invention includes a reel receiving antenna array for individually receiving and supporting a plurality of reels each of which is wound by a strip loaded with electronic components by allowing each of the reels to be supported at outer circumferential side in part, and reading independently RFID tags attached to the reels received individually, a switching unit for activating antennas forming the reel receiving antenna array individually in sequence, and a control unit for providing reception-position information of each of the reels by identifying the RFID tag read.

16 Claims, 15 Drawing Sheets

(56) References Cited

U.S. PATENT DOCUMENTS

| | | | |
|---|---|---|---|
| 2007/0250410 A1* | 10/2007 | Brignone | G06Q 10/087 705/28 |
| 2008/0217394 A1* | 9/2008 | Okada | H05K 13/0417 235/375 |
| 2008/0246616 A1* | 10/2008 | Sakama | G11B 33/0411 340/572.7 |
| 2012/0133488 A1 | 5/2012 | Choi et al. | |

FOREIGN PATENT DOCUMENTS

| | | | |
|---|---|---|---|
| JP | 2009044094 A | * | 2/2009 |
| JP | 2010080613 A | * | 4/2010 |
| JP | 2010-205345 | | 9/2010 |
| KR | 10-2009-0002945 | | 1/2009 |
| KR | 10-2012-0057835 | | 6/2012 |
| KR | 10-2012-0085548 | | 8/2012 |

* cited by examiner

REEL RECEIVING DEVICE BASED ON RFID

CROSS-REFERENCE TO RELATED APPLICATION

This application is an application for a national phase entry based on PCT International Application No. PCT/KR2013/009604, filed on Oct. 25, 2013 before the Korean Intellectual Property Office (KIPO).

BACKGROUND

1. Technical Field

The present disclosure relates to a radio frequency identification (RFID) technology, and more particularly to a technology for recognizing object information by using a RFID system.

2. Description of the Related Art

The RFID system is a non-contact recognition system for transmitting and processing the information of objects and their environment in a radio frequency (RF) by using small chips attached to the objects. The RFID system may include a reader with a data reading function, an RFID tag containing identification information, operating software, network, etc. The RFID system reads the relevant information from the RFID tag through identifying the RFID tag of a thin planar shape that is attached to an object. In the RFID identifying technology of the RFID system, the reader does not have to directly contact the RFID tag or scan within a visible band like a bar code. The RFID technology is evaluated as a technology capable of replacing the bar code because of such advantages, and its application range is very wide.

In the meantime, electronic components may be loaded on a reel. For example, the reel may be loaded with the electronic components in the manner that a strip loaded with the electronic components is wound around the reel. An RFID tag from which information of the loaded electronic components can be known may be attached to the reel. And, a shelf may be used to store and manage the reels. By the way, if many reels are stored on the shelf, the user should inspect the reels one by one to find out the reel loaded with the wanted electronic components, thereby wasting a lot of time and money.

SUMMARY

According to one embodiment, the present disclosure is directed to providing an RFID based reel receiving apparatus that can accurately recognize the reception (storage) positions of the reels loaded with the electronic components.

The RFID based reel receiving apparatus according to an exemplary embodiment of the present disclosure may include a reel receiving antenna array for individually receiving and supporting a plurality of reels each of which is wound by a strip loaded with electronic components by allowing each of the reels to be supported at outer circumferential side in part, and reading independently RFID tags attached to the reels received individually, a switching unit for activating antennas forming the reel receiving antenna array individually in sequence, and a control unit for providing reception-position information of each of the reels by identifying the RFID tag read.

According to an exemplary embodiment, the reel receiving antenna array may be configured such that a part of each of the reels is slidably received between the antennas.

According to an exemplary embodiment, each of the antennas may be a linear antenna, a portion of which is an RF signal input/output portion for radiating an RF signal for reading the RFID tags and transferring an RFID tag signal read to the control unit, and the other portion of which may be used as a ground portion. The ground portion may be used as a common ground for a plurality of antennas.

According to an exemplary embodiment, a portion of each of the antennas may be an RF signal input/output portion for radiating a RF signal for reading the RF tags and receiving an RFID tag signal read, and at the same time be a ground portion. According to an exemplary embodiment, each of the antennas may have an antenna pattern such that an RF signal can input to a position from which the RF signal is radiated through the RF signal input/output portion. According to an exemplary embodiment, each of the antennas may include an upper antenna pattern for radiating an RF signal and a lower antenna pattern for receiving an RF signal, and the upper antenna pattern for radiating the RF signal and the lower antenna pattern for receiving the RF signal are connected to each other at their opposite ends to form an integral type.

According to an exemplary embodiment, each of the antennas may include a protrusion part, projected in a reel-supporting direction, for supporting the reel, and read the RFID tags attached to a particular site of the reel.

According to an exemplary embodiment, each of the antennas may be configured so as to radiate an RF signal in both opposite directions which are substantially perpendicular to the circular plane of the reel against which the antenna abuts, thereby reading the RFID tags. The reel receiving apparatus may further include a shielding means for inducing directivity of the RF signal to a radiation direction of each antenna.

According to an exemplary embodiment, each of the antennas may be formed in a predetermined pattern that can radiate an RF signal, and the RFID based reel receiving apparatus may further include a supporting unit for allowing a particular point of the pattern or a member formed with the pattern to be supported by a main body of the reel receiving apparatus.

According to an additional exemplary embodiment, the reel receiving apparatus may further include a light emitting unit for indicating reception position information identified by the control unit. According to an additional exemplary embodiment, the reel receiving apparatus may further include a variable fixing member for fixing the reel with adjusting a reception position of the reel in accordance with a size of the reel when receiving the reels.

According to an exemplary embodiment of the present disclosure, it is possible to accurately recognize the storage (reception) position of the reels for loading electronic components. That is, since the RFID-based reel receiving apparatus of the present disclosure reads the RF tags attached to a plurality of reels on which electronic components are loaded to inform a user of the storage position of each of the reels, the user can easily know a position of the reel loading the electronic components the user wants. In particular, it is possible for the reel receiving apparatus to find out the reception (storage) position of each of the reels since the reel receiving apparatus reads independently the RF tags attached to the reels loaded with the electronic components. Accordingly, even when numerous reels are stored on the shelf, the user does not have to inspect the reels one by one to find out the very reel containing the electronic components the user wants to know, and thereby reducing time and costs significantly.

Furthermore, by utilizing the shelf for receiving and supporting the reels as an antenna for transmitting and receiving the RF signal, configuration of the reel receiving apparatus can be simplified. In other words, by using the member for receiving and supporting the shelf member itself as the antenna with no need for comprising separate antennas at any other positions to recognize the RFID tags, a structure of the apparatus can be simplified and the recognition rate can be improved.

According to an exemplary embodiment, by designing each antenna to have a protrusion portion projected in a reel-supporting direction, the reels can be stably supported and at the same time the recognition rate of the RFID tag can be raised regardless of the RFID tag position attached to the reel. That is, usually the RFID tag is attached to a particular site of the outer side of the reel, and if each of the antennas has the protrusion portion, the protrusion portion of the antenna and the RF tag attached to the outer side of the reel can be overlapped with each other or positioned near with each other. Thus, the probability that the RFID tag can be recognized through the relevant antenna can be raised.

Moreover, by attaching the RFID tags in various forms such as circular, rectangular to the inner side of the reel to be surrounded with them, the inner side of the reel and the antenna will always overlapped with each other as long as the reel is received in the reel receiving apparatus. Thus, the RF signal can be transmitted and received well therebetween and the RFID tag can be recognized easily.

According to the additional exemplary embodiment, provided is the variable-shaped fixing member for fixing the reel with adjusting the reception position according to the size of the reel when receiving the reel in the reel receiving apparatus. By adjusting the position of the fixing member to be matched with the size of the reel, the reel can be received and supported regardless of the size of the reel.

According to another additional exemplary embodiment, provided is the light emitting unit for indicating the identified reception position information. The light emitting unit may allow the user to intuitively know the reception position information.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1A:
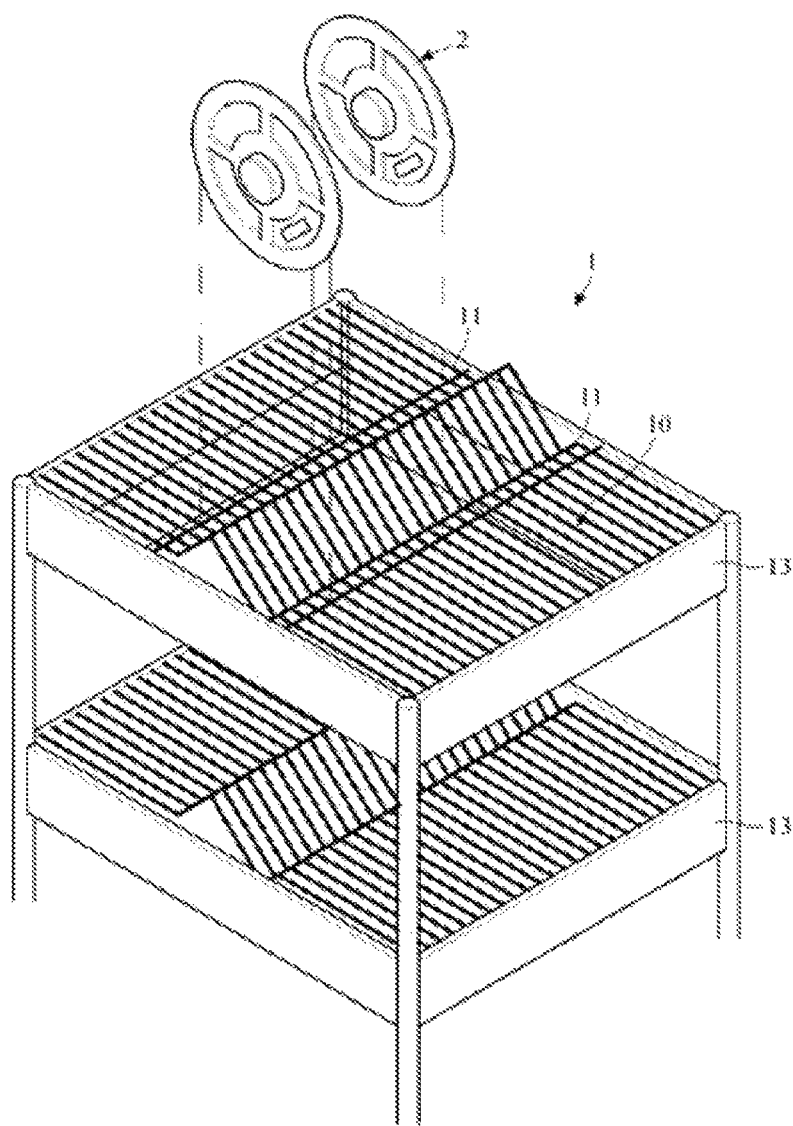
FIGS. 1a to 1d illustrate external perspective views of the RFID-based reel receiving apparatus in accordance with various embodiments of the present disclosure.

Hereinafter, several exemplary embodiments of the present disclosure will be described more fully with reference to the accompanying drawings. In the description of the present disclosure, when it is believed that detailed descriptions of any known function or element may unnecessarily cause the present inventive concept to be unclear, the descriptions may not be provided. In addition, the terms used hereafter are those defined in consideration of the functions in the present disclosure and they may vary according to intentions of users or operators, custom, etc. Therefore, their definitions should be made based on the disclosure throughout the present specification.

FIGS. 1a through 1d illustrate external views of the RFID-based reel receiving apparatus 1 in accordance with several exemplary embodiments of the present disclosure.

Referring to FIGS. 1a through 1d, the reel receiving apparatus 1 includes a main body 13 and a reel receiving antenna array (hereinafter referred to as 'antenna array') 10. The reel receiving apparatus 1 may further include a fixing member 11.

The reel receiving apparatus 1 is an apparatus that can support a number of reels 2 while accommodating them, and may receive and support each of the reels 2 individually. Each of the reels 2 may be wound with a strip in which electronic components are loaded, and the electronic components may be, for example, semiconductor chips. The structure of the reels 2 will be described below in FIG. 2.

The antenna array 10 may include a plurality of antennas formed on the main body 13 and at the same time provide an antenna function while receiving and supporting the reels 2 individually. Each of the antennas forming the antenna array 10 receives and supports each of the reels 2 in terms of physicality, and transmits and receives the RF signal using the RFID technology to find reception (storage) positions of the reels 2 in terms of electricity. For the individual receiving and supporting of each of the reels 2, the antennas of the antenna array 10 are spaced apart from each other by a gap to form slots into which each of the reels 2 can be inserted and are arranged in a line. The fixing member 11 may hold and support each of the reel 2 inserted between antennas such that the reel 2 cannot move.

Figure 1B:
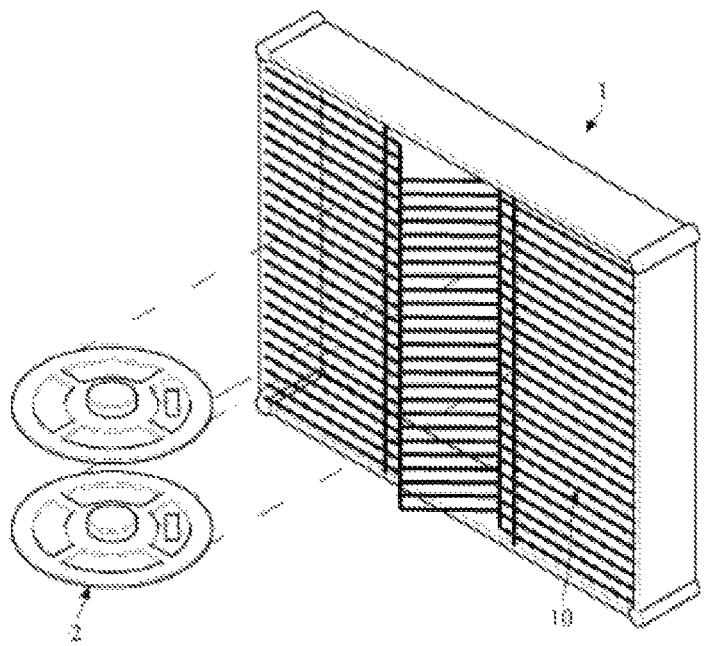
Figure 1C:
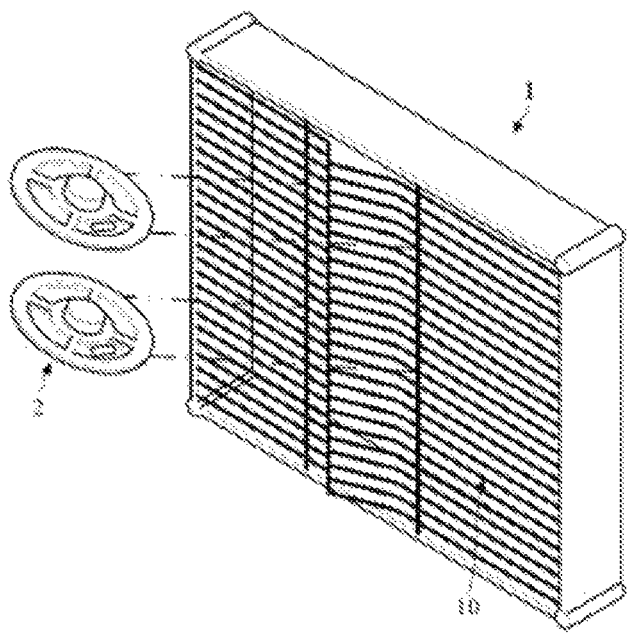
Figure 1D:
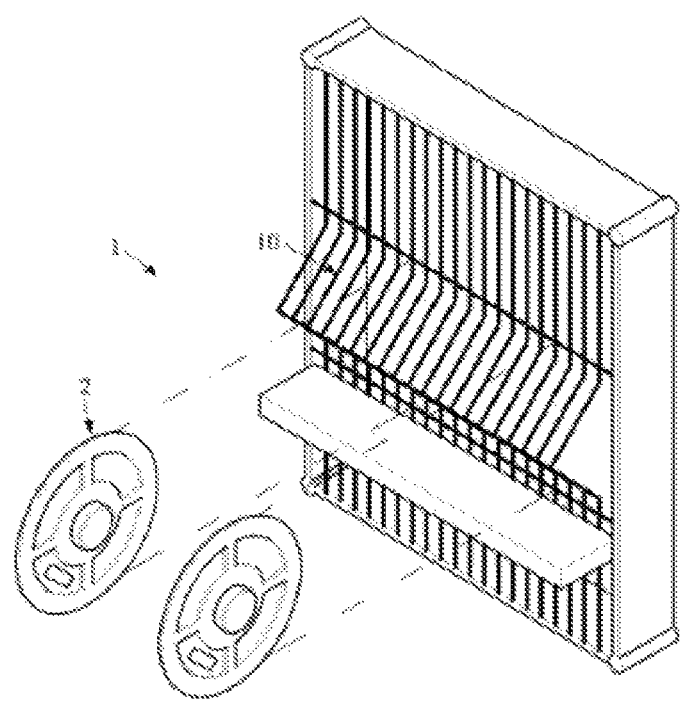

The reel receiving apparatus 1 may have a variety of forms as shown in FIGS. 1a to 1d. FIG. 1a illustrates a structure in which the lying antennas of the reel receiving apparatus 1 that are disposed in a line horizontally with a gap therebetween. FIG. 1b illustrates other structure in which the antennas are arranged in a line vertically with a gap therebwetwen. Also, FIG. 1c illustrates a structure that the antenna array 10 shown in FIG. 1b is inclined upwardly to prevent the reels 2 received between the antenna slots from easily getting out. FIG. 1d illustrates a structure that the reel receiving apparatus 1 stands upright and the antennas therein are arranged in a line horizontally.

The structures of the reel receiving apparatus 1 illustrated in FIGS. 1a to 1d are just exemplary embodiments of the present disclosure to help understanding of the present disclosure, and also can be modified into various forms.

Further, here the descriptions of the present disclosure are focused on the reel receiving apparatus 1 that can receive the reels but the present disclosure can be applied to other applications for receiving any other objects other than the reel if the antenna for transmitting/receiving the RF signals can satisfy the features of receiving as well as supporting the objects individually.

Figure 2A:
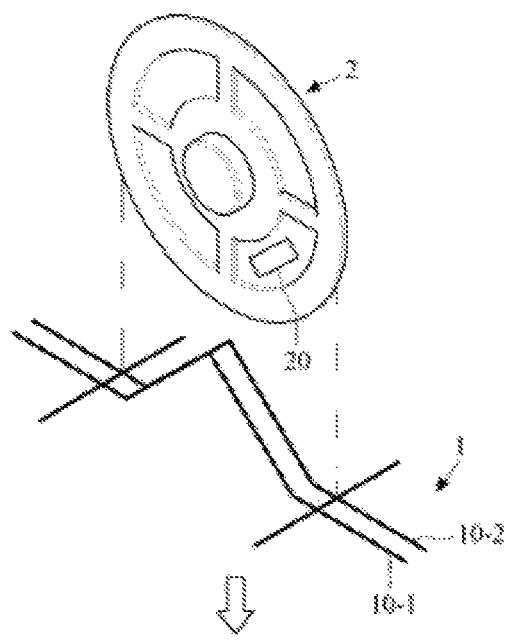
FIGS. 2a and 2b illustrate exemplary states that the reel is received in the reel receiving apparatus in accordance with several embodiments of the present disclosure.
Figure 2A:
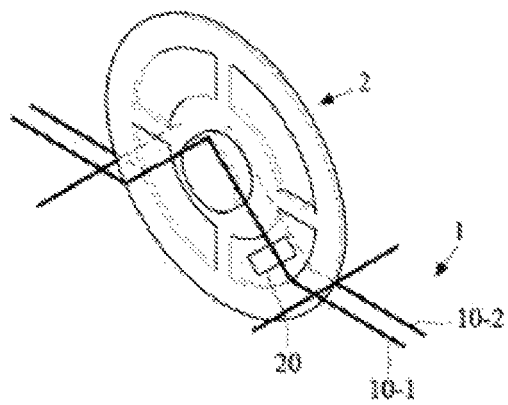
Figure 2B:
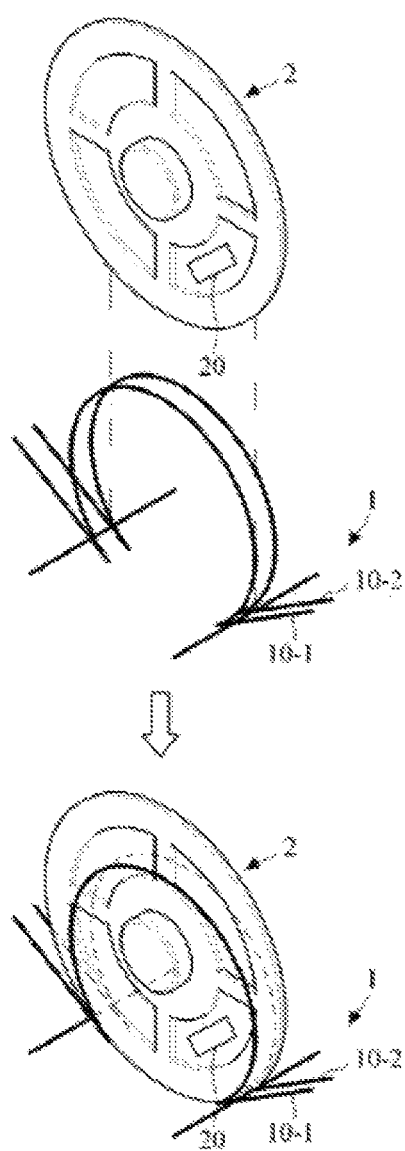

FIGS. 2a and 2b are referential views illustrating the states that the reel 2 is accommodated in the reel receiving apparatus 1 in accordance with various exemplary embodiments of the present disclosure.

Referring to FIGS. 2a and 2b, each antenna of the reel receiving apparatus 1 receives and supports the reels 2 individually such that a part of outer circumferential side of the reel 2 is received into and supported by the slot of the antennas. The reel 2 can be slidably received into the reel receiving apparatus 1. As shown in FIGS. 2a and 2b for instance, the reel 2 slides downwardly and is received into the slot between a first antenna 10-1 and a second antenna 10-2. Each antenna, as shown in FIGS. 2a and 2b, may have a reel-supporting portion projected in a reel-supporting direction. Although having different forms, the antennas illustrated in FIGS. 2a and 2b share the same principle that each of the antennas of the reel receiving apparatus 1 receives and supports individually the reel 2 that can be slidably inserted. Many other implementable forms of the antennas will be described in detail below with reference to FIGS. 5a to 5g.

According to one exemplary embodiment, the tag identification distance of each of the antennas is limited to a local area that does not go beyond a pre-defined limit. For example, the first antenna 10-1 can transmit and receive an RF signal within the limited local area so as to identify only the RFID tag of the reel received into the slot of the first antenna 10-1.

According to another exemplary embodiment, each of the antennas can recognize the RFID tags of the received reels when the reels are received in the reel receiving apparatus 1. That is, the reel receiving apparatus 1 can recognize not only the RFID tags of the received reels within a pre-defined area but also all the RFID tags of the received reels within a coverage range as long as the reels are received. In this case, it can be recognized with each of the antennas that any reel is received in its recognition site by a predetermined recognition algorithm. As an example, the recognition algorithm may be a method of comparing the information obtained through each of the antennas. It may be recognized based on the comparison results whether any RFID tag wanted by a user is received in a particular antenna or not. Examples of the recognition algorithm will be described later in detail with reference to FIG. 8.

An RFID tag 20 is attached to the reel 2, and the reel receiving apparatus 1 reads RFID tag 20 on the received reel 2 and identifies the RFID tag 20 based on the read out information. Identification information and production history data for the electronic components loaded on the corresponding reel 2 may be recorded in the RFID tag. The identification information, being associated with the electronic components loaded on the corresponding reel 2, may include a set of information for the electronic component such as its amount and code, a manufacturer's name, production date, and a production lot number, etc. The production history data represents a history about when the electronic components were loaded on the reel 2 and used for the production.

Figure 3:
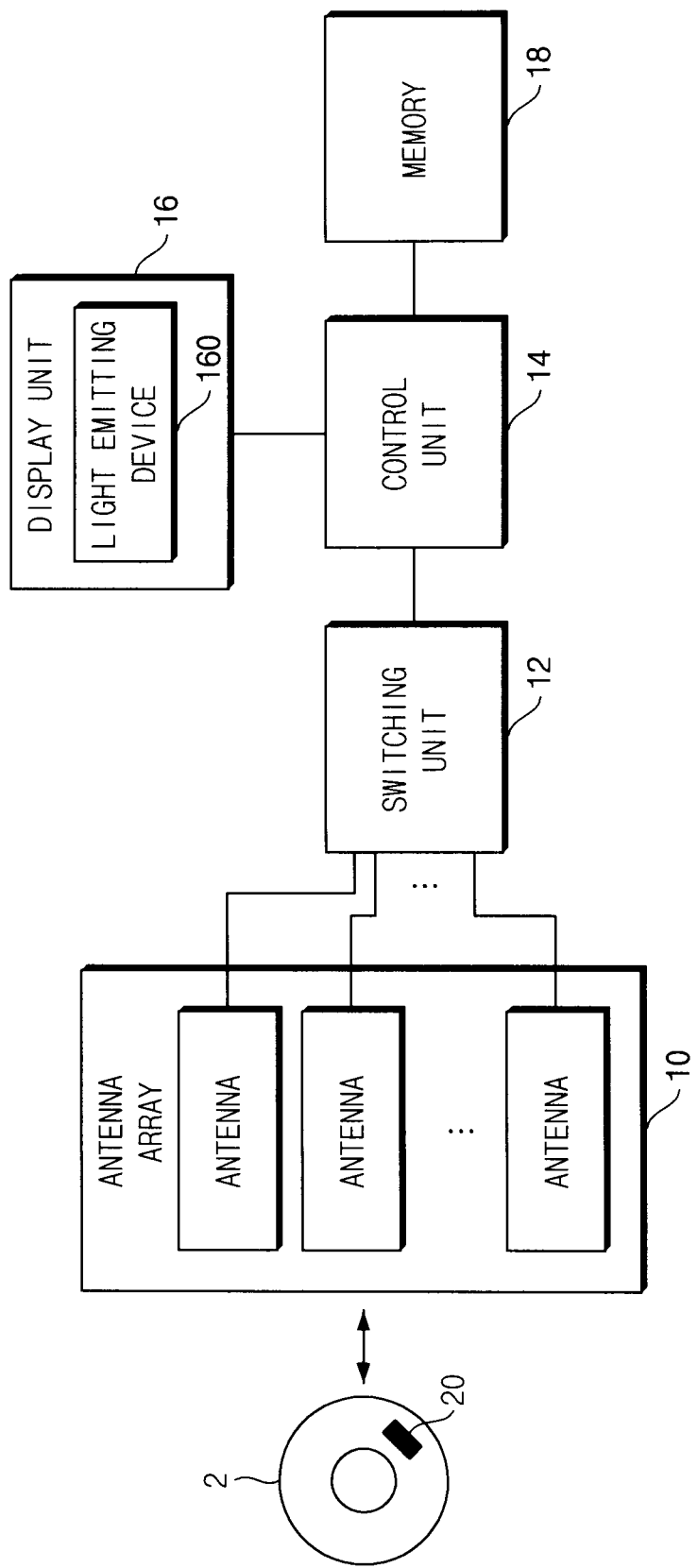
FIG. 3 illustrates a block diagram of the reel receiving apparatus according to an exemplary embodiment of the present disclosure.

FIG. 3 illustrates a configuration of the reel receiving apparatus 1 according to an exemplary embodiment of the present disclosure.

With reference to FIG. 3, the reel receiving apparatus 1 may include an antenna array 10 including a plurality of antennas, a switching unit 12, a control unit 14, a display unit 16 and a memory unit 18.

Each antenna of the antenna array 10 receives and supports the reel 2 individually such that a part of each of a plurality of reels 2 is inserted into and supported in the direction of outer circumferential side by an antenna slot, and independently reads the RFID tags 20 attached to the reels 2 individually received in the antenna slot.

The switching unit 12 may operate to activate the antennas of the antenna array 10 sequentially. The switching unit 12 may select one of the antennas by switching them. That is, the switching unit 12 can switch the antennas in sequence, and select one of them. The antenna array 10 and the switching unit 12 may be formed separately as shown in FIG. 3, but each antenna of the antenna array 10 and the switching unit 12 may be formed in an integral type.

The control unit 14 may identify the RFID tag read by transmitting and receiving the RF signal through the antenna selected by the switching unit 12 and recognize the reception (storage) position of the reel 2 to which the identified RFID tag is attached. And, the control unit 4 may control the result to be output through the display unit 16. For example, when a user wants to find out a reel containing the electronic components and having predetermined information required for a process, the control unit 14 can automatically find out the reception position of the reel on which the corresponding electronic components are loaded and notify the user of the same information through the display unit 16. Accordingly, the user does not have to look into the reels one by one to find out the reel containing the electronic components that the user wants to know, thereby saving time and costs.

The control unit 14 can read the tag information, for example, the identification information and the production history data, stored in the RFID tag 20 of the reel. For this purpose the control unit 14 may be a kind of an RFID reader. The control unit 14 may read the tag information from the RFID tag 20, and control the read information to be output to the display unit 16.

The control unit 14 may control the switching unit 12 so that the antennas can be selected sequentially one by one. In addition, the control unit 14 may acquire position information of the reel 2 from the RFID tag information of the reel 2 through the antenna array 10 and store the position information in the memory unit 18.

The process of recognizing the reception position of the reel 2 by the control unit 12 will be described below. The control unit 14 may control the switching unit 12 so that a predetermined antenna among the antennas of the antenna array 10 can be selected sequentially. And, the control unit 14 may control the selected antenna to radiate an RF signal for reading the RFID tag attached to the reel 2, and receive an RFID tag signal from the RFID tag of the reel 2 through the corresponding antenna. Having received the RFID tag signal, the control unit 14 recognizes the fact that the reel 2 is received in the relevant antenna slot, analyzing the RFID tag information based on the RFID tag signal, and determining whether the received reel is the very reel that containing the electronic components wanted by the user, based on the analysis. Furthermore, the control unit 14 may output the determination result through the display unit 16. For example, the reception position of the reel 2 identified by the control unit 14 may be marked by light emission using the light emitting device 160.

In an exemplary embodiment, the memory unit 18 may store the program for the control unit 14 to process various tasks. And, the position information of the reel 2 obtained from the RFID tag information by the control unit 14 may be stored in the memory unit 18. The memory unit 18 may be included in the reel receiving apparatus 1, or may be included in a separate server and connected with the reel receiving apparatus 1 over the network.

The total number of the antennas of the antenna array 10 and sequential information for each of the antennas may be stored in the memory unit 18. Furthermore, the RFID tag information of the reel identified through the antenna that is currently selected may be stored in the memory unit 18. For example, if the antenna currently selected is the $7^{th}$ antenna among the 16 antennas in total, the RFID tag information identified through the $7^{th}$ antenna may be temporarily stored in the memory unit 18. In addition, the memory unit 18 may store software for controlling the switching unit 12 to select the antennas sequentially, and several data such as antenna selection time period information, antenna location information, etc. With them, all the RFID information can be sequentially recognized.

The display unit 16 may display input commands for operation, and operation views for user input. The display unit 16 may also display reception (storage) position of each reel identified by the control unit 14. The display unit may include the light emitting unit 160 that emit light using, for example, light emitting diodes (LEDs) to indicate the reception position of the reel identified by the control unit 14. The exemplary application of the light emitting unit 160 will be described later with reference to FIG. 9.

Figure 4:
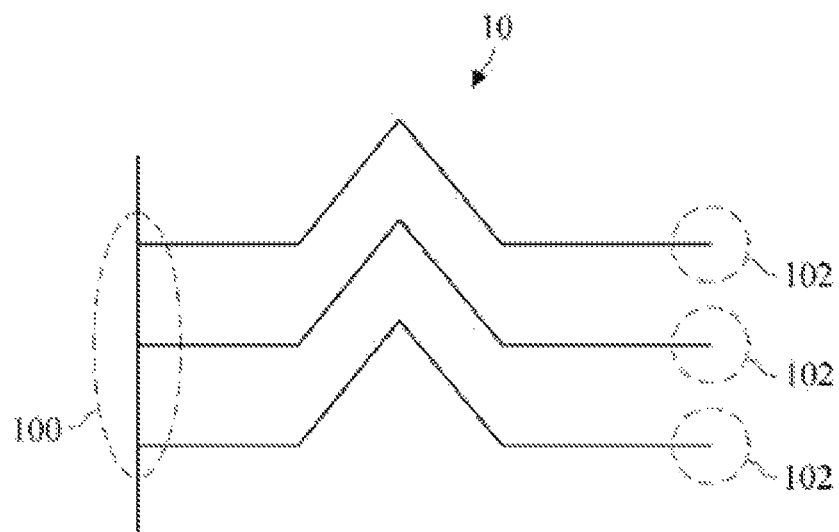
FIG. 4 illustrates a structure of an antenna for transmitting an RF signal according to an exemplary embodiment of the present disclosure.

FIG. 4 illustrates a structure of the antenna for transmitting an RF signal according to an exemplary embodiment of the present disclosure.

With reference to FIGS. 3 and 4, each of the antennas of the antenna array 10 may be a linear type in accordance with an exemplary embodiment, where a portion of the antenna may be an RF signal input/output portion 102 and the other portion of the antenna may be a ground portion 100. The RF signal input/output portion 102 may radiate an RFID signal to read the RFID tag attached to the reel 2, and transfer the RFID tag signal read from the RFID tag of the reel 2 to the control unit 14. The ground portion 100 may be used as the common ground for a plurality of the antennas as shown in FIG. 4.

FIGS. 5a to 5k are appearance diagrams that illustrate several shapes of the antennas in accordance with various exemplary embodiments of the present disclosure.

According to the exemplary embodiment, each antenna of the antenna array 10 may have a protrusion that projects in a reel-supporting direction as shown in FIGS. 5a to 5d. This protrusion is to stably support the reel 2 as well as to improve the recognition success rate of the RFID tag regardless of the position of the reel 2 to which the RFID tag is attached. Usually, the RFID tag may be attached to a specific site of the outer circumferential side of the reel 2. If the antenna has the protrusion as such, the protrusion of the antenna and the RFID tag attached to the outer circumferential side of the reel 2 may be overlapped with each other or be very close to each other, and thus the probability that the corresponding antenna can successfully recognize the RFID tag of the reel 2 can increase.

Figure 5A:
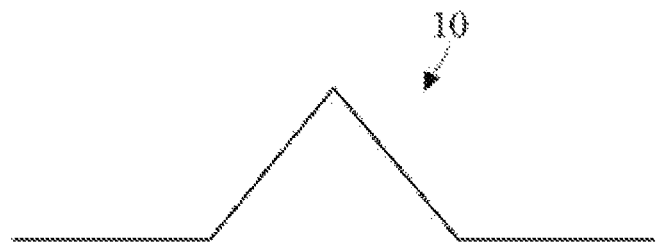
FIGS. 5a to 5k illustrate shapes of the antennas according to various exemplary embodiments of the present disclosure.
Figure 5B:
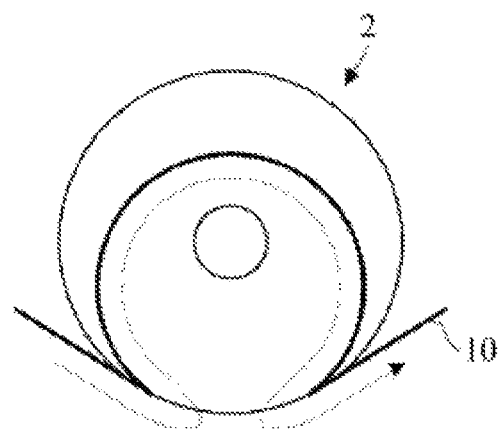
Figure 5C:
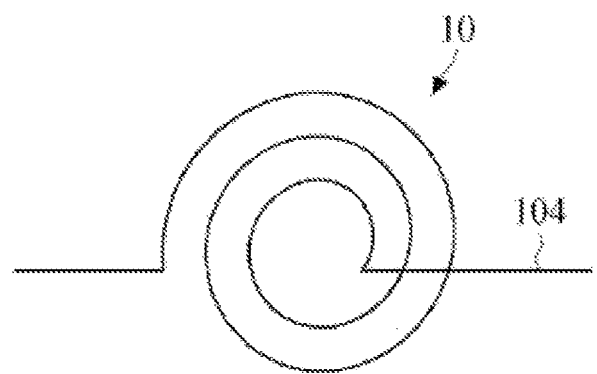
Figure 5D:
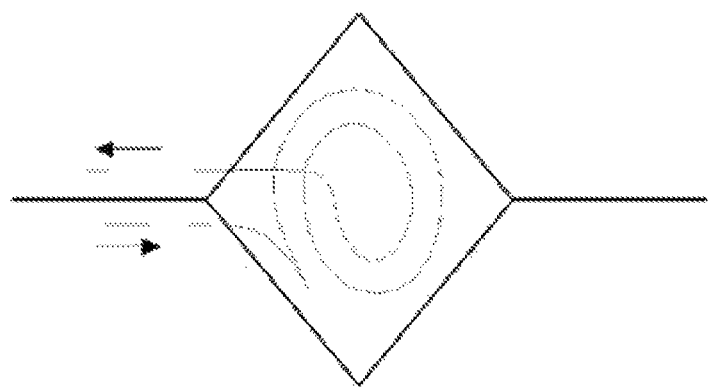

On the other hand, each antenna may be formed in a predetermined shape capable of radiating the RF signal as shown in FIG. 5c and FIG. 5d. If the shape of the antenna is the same as the pattern shown in FIG. 5d, an RF signal will flow in the direction of the arrow around the pattern. Because the other side of the antenna is grounded, the RF signal will be incident in the output direction again. At this time, each antenna may further include a supporting member 104 for supporting a pattern or a specific site of a member formed with a pattern by means of the main body of the reel receiving apparatus 1.

Figure 5E:
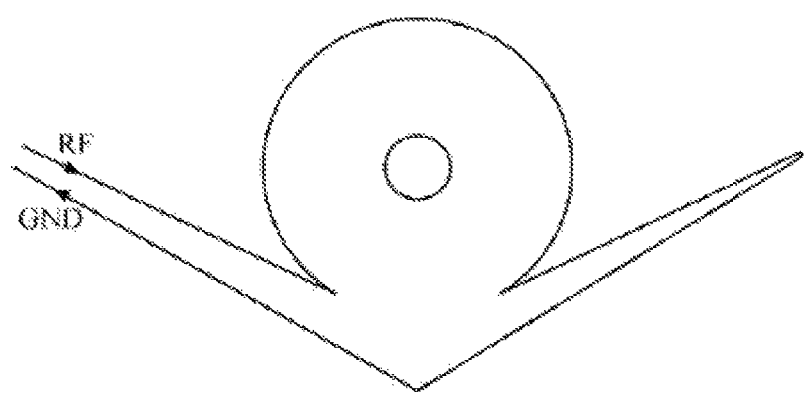
Figure 5F:
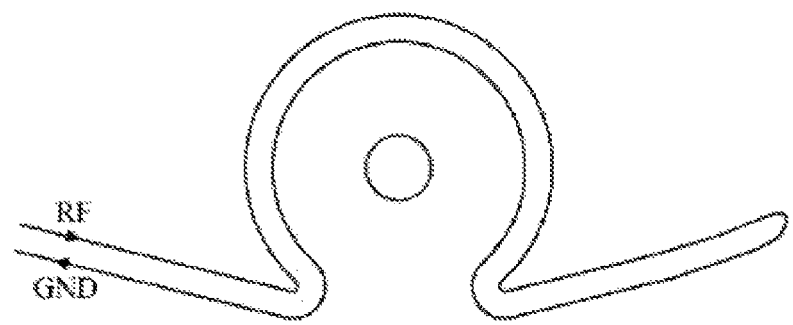

According to other exemplary embodiment, as shown in FIGS. 5e and 5f a portion of each antenna may function as not only the RF signal input/output portion through which the RF signal is radiated to read the RFID tag and the RFID tag signal from the RFID tag is incident, but also the ground portion. In this case, each of the antennas may be configured so as to have an antenna pattern that an RF signal from the RFID tag can be incident on and flow along a portion of the antenna through which the RF signal is radiated to the RFID tag. For example, as shown in FIGS. 5e and 5f an antenna pattern through which the RF signal is radiated and another antenna pattern through which other RF signal is incident are formed at the upper and lower positions, respectively. And the antenna pattern through which the RF signal is radiated and the antenna pattern through which the RF signal is incident meet each other at other portions of the antennas to form an integral type. That is, as shown in FIGS. 5e and 5f, it is possible to form the antenna that the RF signal may be output through the upper side antenna line and the RFID tag signal read from the RFID tag can be input through the lower side antenna line that is connected to the upper side antenna line on their right end. In the exemplary embodiment of FIGS. 5e and 5f, each antenna may have a protrusion shape in the reel-supporting direction.

Figure 5G:
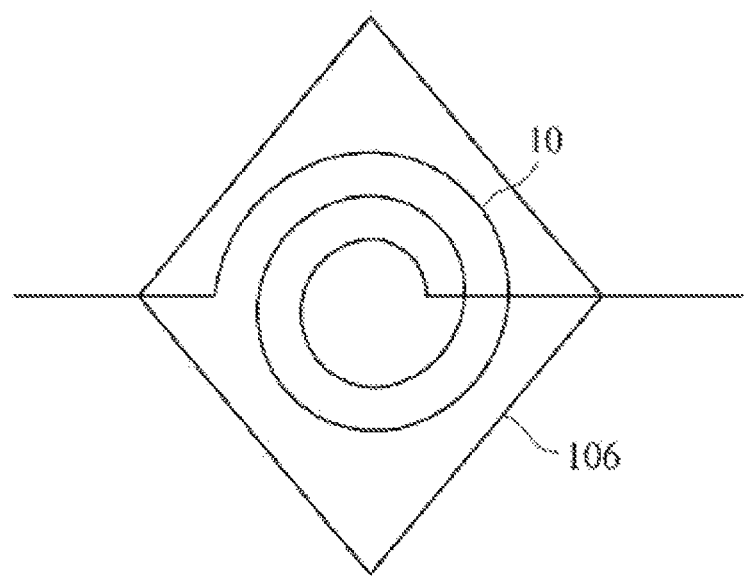
Figure 5H:
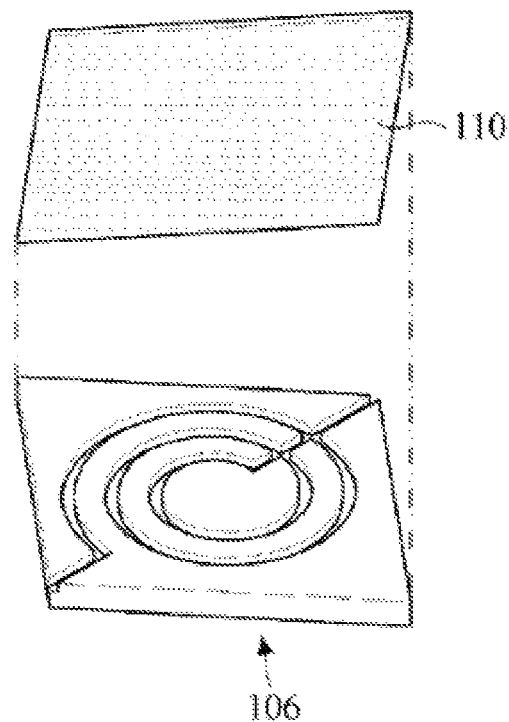

According to another exemplary embodiment, each antenna may be embedded in a cover having a shielding means. For example, an antenna 10 formed in a predetermined pattern capable of radiating the RF signal may be installed at the inner side of the cover 106 as shown in FIG. 5g. In FIG. 5h, illustrated is an exemplary embodiment of the cover 106 that may have a structure made by coupling two substrates to embed the antenna 10 between them. As shown in FIG. 5h, the cover 106 may be formed with a groove corresponding to the pattern of the antenna 10 on its inner side. Forming the groove is to reduce volume of the cover by allowing the cover to be thinner in the production of the antenna by attaching the two substrates. Furthermore, the other substrate may have a shielding means 110, which may be a material with an electromagnetic wave shielding function, to be coated on its one side. The shielding means 110 will make the RF signal originally radiated from the antenna in both opposite directions be radiated in just one direction.

Figure 5I:
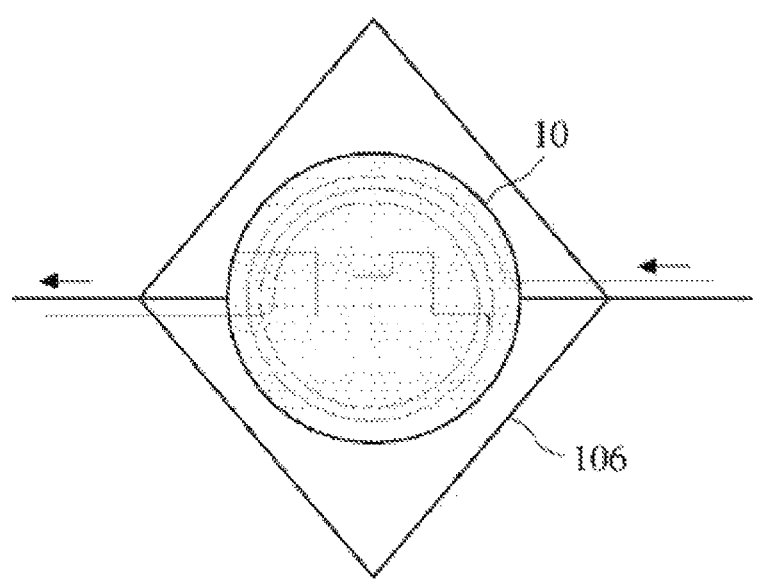
Figure 5J:
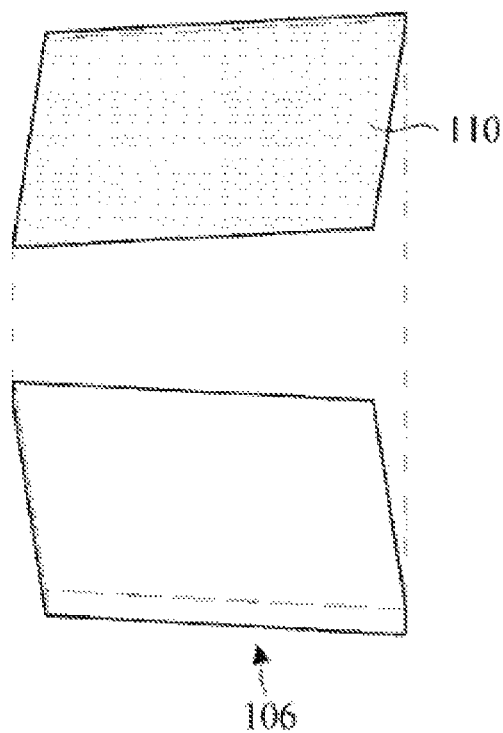

According to another exemplary embodiment, each antenna may be installed on a substrate coated with metal such as copper, aluminum, or the like, for example, a printed circuit board (PCB). For example, the antenna 10 may be installed on the PCB as shown in FIG. 5i, where a shape of the PCB may be, for example, circular but it may be diversified into other geometric form such as oval, rectangular, clover, etc. Further, the substrate installed with the antenna 10 may be mounted on the inner side of the cover 106. The cover 106 may have a structure that its front and rear sides are coupled to each other to allow the substrate installed with the antenna 10 to be mounted as shown in FIG. 5j. Furthermore, any one side of the cover 106 may have the shielding means 110, where the shielding means 110 may be formed by coating a material having an electromagnetic wave shielding function. The shielding means 110 may make the RF signal originally radiated from the antenna in both opposite directions be radiated in just one direction. Although the shielding means 110 is formed on one side of the cover 106 in FIG. 5i, according to other exemplary embodiment the shielding means 110 may be formed on the substrate on which the antenna 10 is installed rather than the cover 106. In FIG. 5i, the direction of the arrow shown in FIG. 5i represents a radiation direction of the RF signal.

Figure 5K:
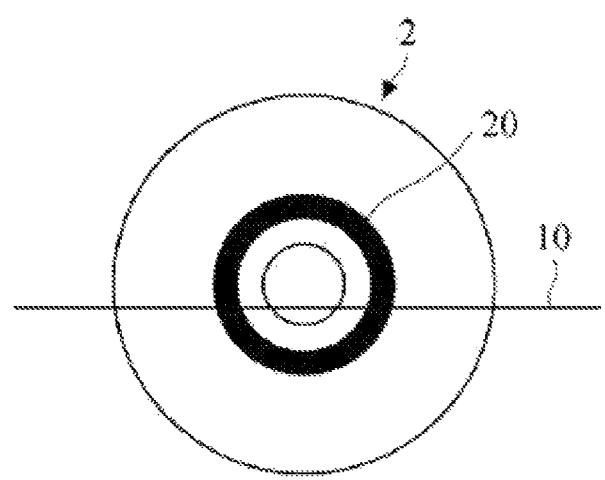

In addition, each of the antennas according to another exemplary embodiment may be in a form of a straight line as shown in FIG. 5k. This is applicable to the case that the RFID tag is attached in a donut shape to the inner side of the reel 2, where as long as the reel 2 is received in the reel receiving apparatus 1, the inner side of the reel 2 and the antenna will be overlapped with each other, and the RF signal can be transmitted and received well therebetween, thereby recognizing easily the RFID tag. On the other hand, the embodiments of the antenna structures described above with reference to FIGS. 5a to 5k are just examples to help understanding of the present disclosure, and thus can be modified into any other forms.

Figure 6:
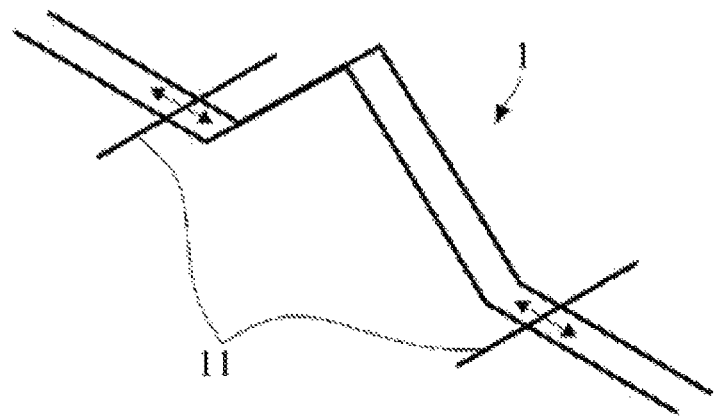
FIG. 6 illustrates a fixing member according to an exemplary embodiment of the present disclosure.

FIG. 6 illustrates a fixing member 11 according to an exemplary embodiment of the present disclosure.

Referring to FIG. 6, the fixing member 11 of the reel receiving apparatus 1 is a means for supporting and fixing the received reel, and may be a variable type that can adjust and fix the storage position of the reel according to the size of reel when the reel is received. The user can widen the interval between the fixing members 11 when the size of the reel to be received is large, whereas the user can reduce the interval between the fixing members 11 when the size of the reel to be received is small. By adjusting the position of the fixing member 11 to be suitable for the size of the reel in this way, the reel 2 can be received and supported stably regardless of the size of the reel.

Figure 7A:
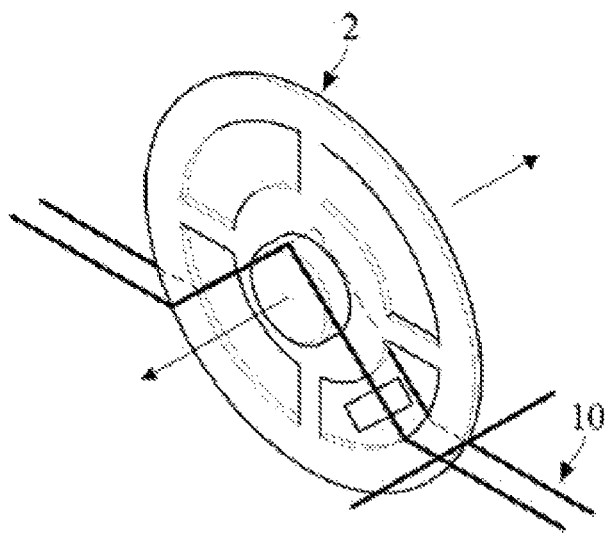
FIGS. 7a and 7b illustrate examples of RFID tag recognition and a shielding member of the antenna according to an exemplary embodiment of the present disclosure.
Figure 7B:
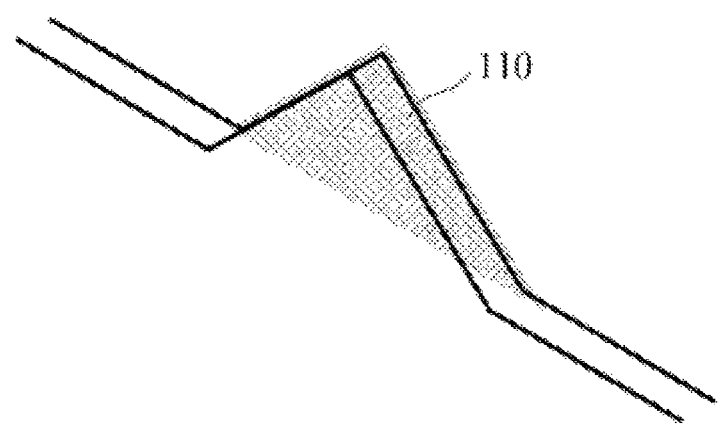

FIGS. 7a and 7b illustrate an example of RFID tag recognition and the shielding means of the antenna in accordance with an exemplary embodiment of the present disclosure.

Referring to FIG. 7a, each of the antennas is configured so as to radiate an RF signal in both opposite directions which may be substantially perpendicular to the circular plane of the reel 2 against which the antenna abuts, thereby reading the RFID tag. If two reels are positioned on both sides, that is, on the left and right sides of an antenna, it is possible to recognize the RFID tags of all the two reels.

According to one exemplary embodiment, the reel receiving apparatus 1 may further include a shielding means 110 for inducing directivity of the RF signal to the respective radiation directions as shown in FIG. 7b. The shielding means 110 may be, for example, a PCB type consisting of a material coated with copper, aluminum, other metal or the like. The shielding means 110 can make the RF signal originally radiated in both directions be radiated in one direction only.

Figure 8:
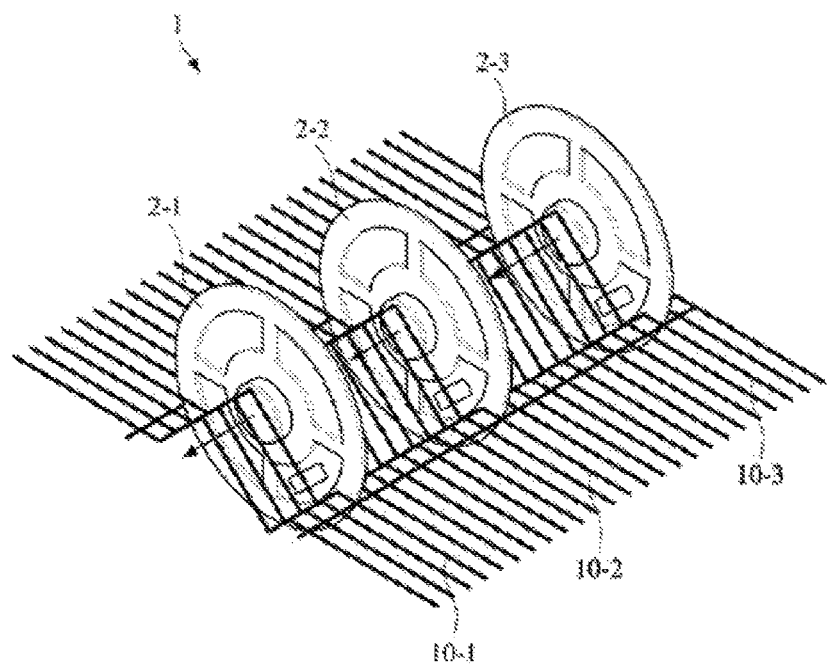
FIG. 8 illustrates a view for describing an algorithm for the antenna to recognize the RFID tag according to an exemplary embodiment of the present disclosure.

FIG. 8 is a diagram for describing an algorithm to recognize the RFID tag of the reel using the antenna in accordance with an exemplary embodiment of the present disclosure.

Referring to FIG. 8, each antenna can radiate a signal to recognize each of the RFID tags of the received reels. That is, with a particular antenna not only the RFID tags of the reels received within a certain pre-defined range can be recognized, but also the RFID tags of all the reels received within its coverage can be recognized as long as they are received in the reel receiving apparatus 1. Through each antenna it can be recognized that any reel is received at its recognition position through a variety of recognition algorithms. As an example of the recognition algorithm, there is a method of recognizing the fact that any reel is positioned at its recognition position, based on a result obtained by comparing a set of information acquired through each of the antennas.

To further describe the above-mentioned recognition algorithm, it is assumed that No. 1 reel 2-1, No. 2 reel 2-2 and No. 3 reel 2-3 are received in the reel receiving apparatus 1. In the situation, since each of the antennas receives the RF signal radiated in one direction due to the shielding means, the first antenna 10-1 can receive the RF signals for identification from all of No. 1 reel 2-1, No. 2 reel 2-2 and No. 3 reel 2-3, whereas the second antenna 10-2 can receive the RF signals from just No. 2 reel 2-2 and No. 3 reel 2-3, and the third antenna 10-3 can receive the RF signal from just No. 3 reel 2-3. Thus, since No. 1 reel 2-1 cannot be identified through the second antenna 10-2 and the third antenna 10-3 but can be identified through the first antenna 10-1 only, it is possible to recognize the fact that No. 1 reel 2-1 is inserted into the slot of the first antenna 10-1.

Figure 9:
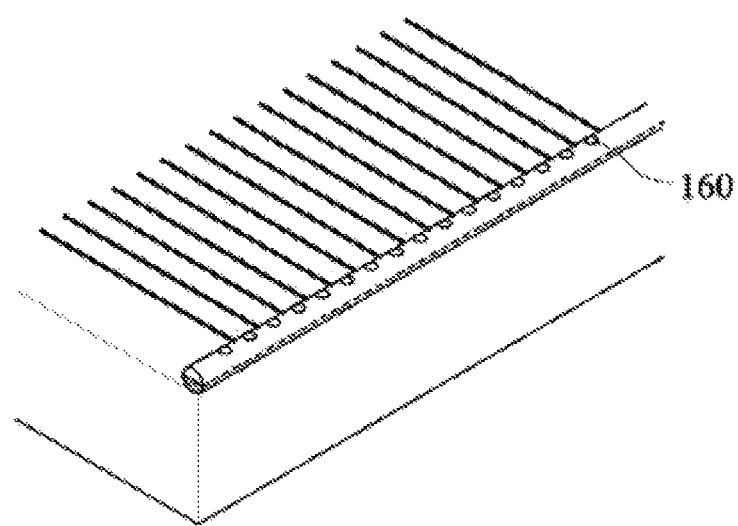
FIG. 9 illustrates an exemplary application of a light-emitting unit of the reel receiving apparatus according to an exemplary embodiment of the present disclosure.

FIG. 9 illustrates an example of application of the light emitting unit 160 of the reel receiving apparatus 1 according to an exemplary embodiment of the present disclosure.

Referring to FIGS. 3 and 9, the reel receiving apparatus 1 may include the light emitting unit 160, such as light emitting devices, for indicating the reception (storage) position of the reel 2 identified by the control unit 14. The light emitting unit 160 may be installed in the main body 13 between respective antennas. For example, as shown in FIG. 9 a rod may be disposed on the top surface of the main body 13 and the light emitting devices are installed along the rod such that the light emitting devices are positioned one by one between the antennas. Of course, there is no need to limit the position to install the light emitting devices 160 to the rod, and the rod may be replaced with any other element. When any information of the RFID tag attached to the reel is identified through any antenna among the antennas, the light emitting device 160 corresponding to the any antenna may emit light. At this time, the user can see the storage position of the reel, loaded with the electronic components, that he or she wants to know, based on whether the light emitting devices emit light or not. Here, the light emitting unit 160 is just an example of the display unit 16, and thus the display unit 16 may be modified in other elements or ways, such as an alarm element, or any combination of them other than the light emitting device.

The foregoing is illustrative of exemplary embodiments of the present inventive concept and is not to be construed as limiting thereof. Although a few exemplary embodiments have been described, those skilled in the art will readily appreciate that many modifications are possible in the exemplary embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An RFID based reel receiving apparatus, comprising:
a reel receiving antenna array for individually receiving and supporting a plurality of reels each of which is wound by a strip loaded with electronic components by allowing each of the reels to be supported at outer circumferential side in part, and reading independently RFID tags attached to the reels received individually;

a switching unit for activating antennas forming the reel receiving antenna array individually in sequence; and a control unit for providing reception-position information of each of the reels by identifying the RFID tag read;

wherein the reel receiving antenna array is configured such that a part of each of the reels is slidably received between the antennas.

2. The RFID based reel receiving apparatus of claim 1, wherein each of the antennas is a linear antenna, a portion of which is an RF signal input/output portion for radiating an RF signal for reading the RFID tags and transferring an RFID tag signal read to the control unit, and the other portion of which is a ground portion.

3. The RFID based reel receiving apparatus of claim 2, wherein the ground portion is used as a common ground for a plurality of antennas.

4. The RFID based reel receiving apparatus of claim 1, wherein a portion of each of the antennas is an RF signal input/output portion for radiating a RF signal for reading the RF tags and receiving an RFID tag signal read, and at the same time is a ground portion.

5. The RFID based reel receiving apparatus of claim 4, wherein each of the antennas has an antenna pattern such that an RF signal is input to a position from which the RF signal is radiated through the RF signal input/output portion.

6. The RFID based reel receiving apparatus of claim 5, wherein each of the antennas comprises an upper antenna pattern for radiating an RF signal and a lower antenna pattern for receiving an RF signal, and the upper antenna pattern for radiating the RF signal and the lower antenna pattern for receiving the RF signal are connected to each other at their opposite ends to form an integral type.

7. The RFID based reel receiving apparatus of claim 1, wherein each of the antennas comprises a protrusion portion, projected in a reel-supporting direction, for supporting the reel, and reads the RFID tags attached to a particular site of the reel.

8. The RFID based reel receiving apparatus of claim 1, wherein each of the antennas is configured so as to radiate an RF signal in both opposite directions which are substantially perpendicular to the circular plane of the reel against which the antenna abuts, thereby reading the RFID tags.

9. The RFID based reel receiving apparatus of claim 8, further comprising a shielding means for inducing directivity of the RF signal to a radiation direction of each antenna.

10. The RFID based reel receiving apparatus of claim 9, further comprising a cover for being mounted with each antenna on an inner side thereof, and the shielding means is formed on one side of the cover.

11. The RFID based reel receiving apparatus of claim 10, wherein the cover is formed with a groove that is matched with a pattern of the antenna.

12. The RFID based reel receiving apparatus of claim 1, wherein each of the antennas is installed on a substrate comprising a shielding means.

13. The RFID based reel receiving apparatus of claim 1, wherein each of the antennas is installed on a substrate that is mounted on an inner side of a cover, and the cover comprises a shielding means forming one side thereof.

14. The RFID based reel receiving apparatus of claim 1, wherein each of the antennas is formed in a predetermined pattern that can radiate an RF signal, and the RFID based reel receiving apparatus further comprises a supporting unit for allowing a particular point of the pattern or a member formed with the pattern to be supported by a main body of the reel receiving apparatus.

15. The RFID based reel receiving apparatus of claim 1, further comprising a light emitting unit for indicating reception position information identified by the control unit.

16. The RFID based reel receiving apparatus of claim 1, further comprising a variable fixing member for fixing the reel with adjusting a reception position of the reel in accordance with a size of the reel when receiving the reels.

* * * * *